United States Patent Office 2,758,973
Patented Aug. 14, 1956

2,758,973
PROCESS FOR PREPARING LUBRICATING GREASE COMPOSITIONS

Arnold J. Morway, Clark Township, Union County, and Thomas E. Witts, Elizabeth, N. J., assignors to Esso Research and Engineering Company, a corporation of Delaware No Drawing. Application May 29, 1952,
Serial No. 290,830

6 Claims. (Cl. 252—42)

This invention relates to lubricating grease compositions useful for the lubrication of high temperature anti-friction bearings and to a process for their preparation. Particularly the invention relates to a process for preparing anti-friction bearing lubricants comprising adding a synthetic lubricating oil to a mixture of complex soap forming materials and a mineral oil, and subjecting the mixture to the action of high rates of shear without concurrent mixing.

For lubricating some types of anti-friction bearings, particularly ball bearings, the grease composition necessary to furnish the desired long and continuous lubrication at elevated temperature is a "channeling" type grease. That is to say, a grease which gives a low torque and low bearing temperature rise is needed since in an operating bearing of this type the major portion of the grease is pushed out of the path of the rolling elements during the first few revolutions of the bearing and remains out of this path. Thus no unnecessary power loss or heat build-up occurs in moving the grease in the bearing after the first few minutes of operation. The excess grease thrown out of the ball path then acts as a lubricant reservoir and as a seal to prevent entrance of dirt and other undesirable contaminants into the lubricated bearing. This "immediate channeling" type grease is obtained in the prior art by high soap concentration, the grease structure being modified during manufacture to obtain a relatively high penetration. The requirements of a grease of this type are as follows: a high dropping point, usually in excess of about 350° F.; soft, unctuous characteristics; and a stable structure.

An excellent channeling type grease is described in detail in United States Patent No. 2,265,791, issued December 9, 1941, to Zimmer and Morway. The grease composition of this patent is prepared by thickening a mineral lubricating oil to a grease consistency with a relatively large proportion of the sodium soap of refined rapeseed oil. There is also present in the finished grease a slight excess of sodium hydroxide. There may also be present, if desired, a small percentage of an oil-soluble petroleum sulfonate. This grease composition gives excellent long continuous service in both high and low temperature ball bearing operation and in service where the temperature may vary over extremely wide ranges as sometimes occurs in refrigeration equipment, i. e., temperatures ranging from +300° F. or even higher to temperatures about −30° F.

In general the channeling type lubricating grease compositions described above are excellent for lubricating ball bearings. These greases, however, are less desirable for use in roller bearings since different and more complex lubrication problems exist in these bearings. It has been found that the action of both ball and roller bearings causes the high soap content grease compositions to become stiffer and the desired soft unctuous characteristic necessary for bearing lubrication is lost. While this hardening is desirable in ball bearing use, allowing ease of channeling, it is undesirable in roller bearing service since hardening and channeling prevent satisfactory lubrication of the roller shoulders and back roller surfaces. This is particularly noticeable in double row bearings.

These prior art channeling greases also tend to harden on storage because of the unbalanced grease structure, that is, the abnormally high proportion of soap to oil base. Upon standing, the grease which has been churned or stirred down to the desired consistency (penetration) tends to settle, or "snap back" to the consistency which is normal for the high soap content.

The instant invention has as its object the formation of a lubricating grease having desirable high temperature properties suitable for use in ball or roller bearings by a process which utilizes a synthetic lubricating oil to cut back a complex soap base grease and a subsequent hardening to grease consistency of the mixture with the application of high rates of shear without concurrent mixing. This improved technique results in the following advantages.

1. Greases having channeling properties and proper consistency which will satisfactorily lubricate anti-friction bearings without undesirable loss of power, heat rise, or premature bearing failure.

2. Decreased tendency to harden during use in a roller bearing, thus maintaining the proper consistency to work into roller bearing crevasses and shoulders during use.

3. Decreased tendency to harden during storage, since the desired consistency (penetration) is achieved with a smaller amount of soap than was hitherto believed possible.

4. An obvious economic advantage due to retention of the required consistency for anti-friction bearing lubrication with considerably smaller amounts of soap than the prior art has heretofore thought necessary.

5. Improved lubrication properties at both elevated and low temperatures due to the inclusion of a synthetic lubricating oil.

Briefly speaking the instant invention involves a process for the preparation of high temperature lubricating grease compositions which comprises the steps of preparing a mixture of a complex soap and a mineral oil, heating the mixture to a temperature above about 480° F. to completely dissolve the soap, and cooling the mixture to a temperature of about room temperature to 250° F. When the grease has reached this temperature and the complex soap crystals have attained their optimum growth, a synthetic lubricating oil is added and the total mixture is subjected to high rates of shear without concurrent mixing to form the desired final product.

As was stated above, the first step in the improved process is the formation of a mixture of a complex soap and a mineral oil. By complex soap is meant those thickening agents which comprise a complex of two or more components. Complexes may be formed from high molecular weight acid soaps and low molecular weight acid salts, such as the salts of acetic, acrylic, methacrylic, furoic acid, etc. The soap of the rapeseed oil glyceride, such as that described in U. S. 2,265,791, is one such complex soap and is utilized in the preferred embodiment of this invention.

It has been found in the prior art that the metallic soaps, preferably the sodium soaps of refined unblown rapeseed oil, produce a grease having desirable high temperature properties. The sodium soap of rapeseed oil is ordinarily prepared by admixing the rapeseed oil with a portion of a mineral base oil, usually a coastal type oil having excellent soap solvency properties but relatively low flash and correspondgly high volatility inherent in lube oils derived from aromatic type crudes. A viscosity index within the range of from about 45 to 60 is desirable. An aqueous solution of the desired metal hydroxide is then added. The temperature is raised gradually to one at which the neutralization products of the rapeseed oil becomes completely soluble. Ordinarily this will be within the range from about 480° F. to 520° F. or higher.

Any addition agents used, such as oxidation inhibitors, and the like, are added along with any additional quantity of the base oil used, prior to the final temperature attained, that is, they are usually added at a temperature in the range of 250° F. to 300° F.

Once the grease is cooled to a temperature such that the soap crystals have attained their optimum size, that is, to a temperature within a range of from room temperature to 250° F., there is added to the formulation a quantity of a synthetic lubricating oil and the mixture is then thickened to a grease consistency by the application of high rates of shear without concurrent mixing.

The synthetic lubricating oil that is used to cut back the complex soap grease may be any of the synthetic oils known to the art. Generally preferred are those carbon atoms are most desirable and may be either of mono- or polybasic acids, esters of glycols, polymerized glycols, glycol ethers, complex esters such as alcohol-dibasic acid-glycol esters or alcohol-dibasic acid-glycol monobasic acid esters, or blends of esters. It is generally found that esters containing from about 10 to 30 carbon atoms are most desirable and may be either of branched or straight chain configuration. Exemplary of these especially preferred synthetic lubricants are the following: di-2-ethyl hexyl sebacate, di-octyl sebacate, di-nonyl sebacate, di-2-ethyl hexyl adipate, di-$C_7$ Oxo adipate, di-$C_8$ Oxo adipate, di-$C_{13}$ Oxo adipate, complex esters such as the ester formed by reacting two mols of a half ester of a $C_4$-$C_{10}$ alcohol and a dibasic acid with one mol of a polyethylene glycol, etc., and the mixtures of the above.

In addition to the ester type synthetic lubricating oils, other synthetic oils may be used. Polymerized silicone oils, long-chain formals, carbonates, polymerized olefins, copolymers of aliphatic and aromatic compounds, etc. are also operable in the process of this invention. The only limitation upon the synthetic lubricant chosen as the cut back oil is that it have characteristics that are to be utilized in the finished lubricating grease formulation.

After the grease has been cut back with the synthetic oil, the total mixture is subjected to rates of shear in the order of 10,000 to 500,000 reciprocal seconds or more in an apparatus designed to deliver these rates of shear without concurrent mixing. This equipment is so designed as to cause the grease to flow at high velocity and high pressure under streamlined conditions. Equipment such as the Gaulin homogenizer, manufactured and sold by the Manton-Gaulin Manufacturing Company of Everett, Massachusetts, or rolling mills wherein the grease passes through steel rollers with minute clearances may be used. The well known Morehouse mill wherein the milled material passes through spinning discs at low clearances is also operable but less desirable. A pressure viscosimeter if operated at sufficiently high pressures to deliver rates of shear within the desired range, may be used to achieve the desired results. Various other mechanical means may also be used for the application of this shearing force to the grease formulation so long as no concurrent mixing occurs.

Th recapitulate briefly, the process of this invention involves the steps of making a mixture of a complex soap such as a soap of rapeseed oil and a mineral oil of desired solvency properties for the soap thickener, heating to a temperature sufficient to completely dissolve the soap, cooling to form the soap crystals, adding a quantity of a synthetic lubricating oil, and subjecting the whole mixture to rates of shear in the order of 10,000 to 500,000 reciprocal seconds, preferably 100,000 to 4,000,000, without concurrent mixing.

The original soap content used will be such as to give a grease formulation containing from 20% to 50% soap before the addition of the synthetic oil. It has been found that by the former processes of the prior art a soap content within this range is required to give the desired ASTM penetration of 200 and 350 mm./10. The quantity of synthetic lubricating oil added will be such as to reduce the overall soap content of the final product to one within a range of from 6% to 18%. The subsequent treating step, subjection to the high rates of shear without concurrent mixing, results in a finished product having a penetration value of between 200 and 350 mm./10, preferably 275 to 300 mm./10. It is to be noted that a lubricating grease having a penetration within the desired range is obtained with a fractional amount of the total soap content hitherto thought necessary.

The lubrication life of an anti-friction bearing lubricant has been thought to be generally proportional to the amount of soap present. It has been found that the lubricating compositions of this invention, containing approximately ¼ to ⅓ the amount of soap hitherto thought necessary, gives a lubricating life comparable to the prior art greases. This is due to the incorporation of the synthetic lubricating oils which are generally excellent for this purpose.

EXAMPLE I

By the procedure outlined in detail below the grease composition having the following formulation was prepared:

| Ingredients: | Percent by weight |
|---|---|
| Rapeseed oil | 22.0 |
| Sodium hydroxide | 4.75 |
| Sodium sulfonate | 0.5 |
| Phenyl-alpha-naphthylamine | 1.0 |
| Metal deactivator (condensation product of 1 mol propylene diamine and 2 mols salicylaldehyde) | 0.5 |
| Mineral oil (coastal distillate 50 SUS/210° F.) | 71.25 |

Procedure

The rapeseed oil, sodium sulfonate (50% solution in oil) and ⅓ of the mineral oil were charged to a fire-heated grease kettle and warmed to 150° F. An aqueous solution of the sodium hydroxide (40%) was charged and the mass heated with stirring to 300° F. After dehydration the balance of the mineral oil was added and the grease heated to 500° F. At this temperature heating was discontinued, the grease was cooled to 235° F., additive materials were added and the grease further cooled to below 200° F. This grease composition had the following standard grease inspections:

| | |
|---|---|
| ASTM penetration (mm./10, 77° F.): | |
| Unworked | 295 |
| Worked (60 strokes) | 300 |
| Worked (100,000 strokes) | 315 |
| Dropping point (°F.) | 500+ |
| Free alkalinity | 0.32 |
| Norma Hoffman oxidation test (hours to 5 p. s. i. drop in oxygen pressure) | 290 |

Using the grease formulation of Example I as a base, there was added a quantity of a synthetic lubricating oil consisting of a blend of 65% di-2-ethylhexyl sebacate and 35% of a complex ester prepared by forming the 2-ethylhexyl half ester of adipic acid and reacting 2 mols of said half ester with one mol of a polyethylene glycol having a molecular weight of about 200. Approximately 50 weight per cent of the grease and 50 weight per cent of the synthetic oil blend were admixed in a grease kettle. The soft semi-fluid lubricant obtained separated clear oil on standing. The blend was passed through a Gaulin homogenizer and thickened. This grease composition gave the following inspections:

| | |
|---|---|
| ASTM penetration (mm./10, 77° F.): | |
| Unworked | 285 |
| Worked (60 strokes) | 315 |
| Worked (100,000 strokes) | 385 |
| Dropping point (°F.) | 356 |
| Free alkalinity | 0.16 |
| Norma Hoffman oxidation test (hours to 5 p. s. i. drop in oxygen pressure) | 436 |
| Lubrication life in ABEC-NLGI spindle (hours at 250° F. at 10,000 R. P. M.) | 1860 |

EXAMPLE III

Using the grease base and procedure of Example II a second grease was prepared. In this sample a silicone fluid (Dow Corning, Fluid 710) was employed as the synthetic lubricating fluid. This silicone fluid was the phenyl silicone.

*Properties (after homogenization)*

Penetration (mm./10, 77° F.):
- Unworked _____ 290
- Worked (60 strokes)_____ 310
- Worked (100,000 strokes) (plate contains 270 ⅛″ holes)_____ 420

Dropping point (°F.)_____ 434

Norma Hoffman oxidation test (hours to 5 p. s. i. drop in oxygen pressure)_____ 508+

EXAMPLE IV

This example was identical to Example II except a formal of $C_8$ Oxo alcohol, prepared by reacting $C_8$ Oxo alcohol with formaldehyde, was employed as the synthetic fluid.

*Properties*

ASTM penetration (mm./10, 77° F.):
- Unworked _____ 285
- Worked (60 strokes)_____ 320
- Worked (100,000 strokes)_____ 410

Dropping point (°F.)_____ 392

Norma Hoffman oxidation test (hours to 5 p. s. i. drop in oxygen pressure)_____ 398

All of the greases of Examples II, III, and IV showed less than 3.0% oil separation in an accelerated bleeding test (50 hours at 210° F.).

It will be seen from the data reported above that the grease compositions of this invention have outstanding spindle lives, oxidation resistant properties and are generally excellent lubricating grease compositions.

In summary this invention relates to a process for the preparation of lubricating grease compositions having outstanding utility as anti-friction bearing lubricants. The lubricating grease compositions are prepared generally by admixing with the mineral lubricating oil a grease-forming amount of a complex soap, heating to a temperature sufficient to completely dissolve said soap, cooling the mixture to a temperature below the transition point of the soap, adding a quality of a synthetic lubricating oil to the mixture and subjecting the resulting mixture to the action of high rates of shear in the order of 10,000 to 500,000 reciprocal seconds without concurrent mixing.

What is claimed is:

1. The process for preparing a channeling type high temperature anti-friction bearing lubricant which comprises the steps of admixing with a mineral lubricating oil a grease forming amount of a complex soap, heating to a temperature sufficient to completely dissolve said soap, cooling the mixture to a temperature below the transition point of the soap, then adding a quantity of a synthetic lubricating oil sufficient to result in a mixture containing from about 6% to 18% soap, and subjecting the resulting mixture to the action of high rates of shear in the order of 10,000 to 500,000 reciprocal seconds under streamlined conditions to obtain a finished grease having an ASTM penetration value between 200 and 350 mm./10.

2. A process according to claim 1 wherein said complex soap is an alkali metal soap of rapeseed oil.

3. A process of preparing a channeling type high temperature anti-friction bearing lubricant which comprises the steps of admixing with a mineral lubricating oil from 20% to 50% by weight of an alkali metal soap of rapeseed oil, heating the mixture to a temperature above about 480° F. but below the flash point of the mineral lubricating oil, cooling the heated mixture to a temperature within from room temperature to about 250° F., then adding a quantity of a synthetic lubricating oil sufficient to result in a mixture containing from about 6% to 18% soap based on the weight of the total formulation and subjecting the resulting mixture to the action of high rates of shear in the order of 100,000 to 400,000 reciprocal seconds under streamlined conditions to obtain a finished grease having an ASTM penetration value between 200 and 350 mm./10.

4. A process according to claim 3 wherein said synthetic oil consists essentially of 65% by weight of di-2-ethylhexyl sebacate and 35% by weight of a complex ester formed by reacting two mols of a half ester of 2-ethylhexanol and adipic acid with one mol of a polyethylene glycol having a molecular weight of about 200.

5. A process according to claim 3 wherein said synthetic oil is polymerized phenyl silicone.

6. A process for preparing a channeling type high temperature anti-friction bearing lubricant which comprises the steps of admixing about 26% by weight of the sodium soap of rapeseed oil with a mineral oil, heating the mixture to a temperature of about 500° F., cooling the heated mixture to about 235° F., then adding to the cooled mixture a quantity of a synthetic lubricating oil sufficient to result in a composition containing from about 6% to about 18% soap, percentages being by weight based on the weight of the total composition, and subjecting the resulting mixture to the action of high rates of shear in the order of about 100,000 to 400,000 reciprocal seconds under streamlined conditions to obtain a finished grease having an ASTM penetration value between 200 and 350 mm./10.

References Cited in the file of this patent

UNITED STATES PATENTS

| Number | Name | Date |
|---|---|---|
| 2,265,791 | Zimmer et al. | Dec. 9, 1941 |
| 2,318,668 | Calkins | May 11, 1943 |
| 2,383,906 | Zimmer et al. | Aug. 28, 1945 |
| 2,431,453 | Beerbower et al. | Nov. 25, 1947 |
| 2,436,347 | Zimmer et al. | Feb. 17, 1948 |
| 2,450,222 | Ashburn | Sept. 28, 1948 |
| 2,461,276 | Hetherington | Feb. 8, 1949 |
| 2,516,137 | Morway et al. | July 25, 1950 |
| 2,581,127 | Morway et al. | Jan. 1, 1952 |
| 2,588,279 | O'Halloran | Mar. 2, 1952 |
| 2,598,154 | Bailey et al. | May 27, 1952 |
| 2,599,343 | Morway et al. | June 3, 1952 |
| 2,610,947 | Morway | Sept. 16, 1952 |
| 2,626,241 | Sparks et al. | Jan. 20, 1953 |
| 2,639,266 | Dilworth et al. | May 19, 1953 |
| 2,704,363 | Armstrong | Mar. 15, 1955 |

FOREIGN PATENTS

| Number | Country | Date |
|---|---|---|
| 18,249 | Great Britain | Aug. 19, 1902 |
| 22,875 | Great Britain | Nov. 15, 1903 |
| 22,941 | Great Britain | Nov. 5, 1905 |

OTHER REFERENCES

Design of Emulsifying Machines, Robert Johnson, in text of Emulsion Technology, pages 88–118, 2nd ed., 1946, Chemical Pub. Co., Inc., Brooklyn, New York.